(12) United States Patent
Spizig et al.

(10) Patent No.: US 9,891,418 B2
(45) Date of Patent: Feb. 13, 2018

(54) APPARATUS FOR IMAGING A SAMPLE SURFACE

(75) Inventors: Peter Spizig, Niederstotzingen (DE); Wofram Ibach, Ulm (DE); Detlef Sanchen, Blaustein (DE); Gerhard Volswinkler, Laupheim (DE); Olaf Hollricher, Neu-Ulm (DE)

(73) Assignee: WITEC Wissenschaftliche Instrumente Und Technologie GMBH, Ulm (DE)

( * ) Notice: Subject to any disclaimer, the term of this patent is extended or adjusted under 35 U.S.C. 154(b) by 367 days.

(21) Appl. No.: 13/580,324

(22) PCT Filed: Apr. 13, 2011

(86) PCT No.: PCT/EP2011/001837
§ 371 (c)(1),
(2), (4) Date: Aug. 21, 2012

(87) PCT Pub. No.: WO2011/131311
PCT Pub. Date: Oct. 27, 2011

(65) Prior Publication Data
US 2012/0314206 A1    Dec. 13, 2012

(30) Foreign Application Priority Data

Apr. 19, 2010 (DE) .................. 10 2010 015 428
Aug. 2, 2010 (DE) .................. 20 2010 010 932 U

(51) Int. Cl.
*G01N 21/00* (2006.01)
*G02B 21/00* (2006.01)

(52) U.S. Cl.
CPC .................. *G02B 21/006* (2013.01)

(58) Field of Classification Search
CPC ........ G02B 21/006; G01B 11/24; G01B 5/28; G01N 21/64; G01N 21/49; G01N 21/88; G01J 3/28; G01J 3/44; H01J 37/26
(Continued)

(56) References Cited

U.S. PATENT DOCUMENTS 5,581,082 A * 12/1996 Hansma et al. .................. 850/3
2004/0109170 A1 6/2004 Schick
(Continued)

FOREIGN PATENT DOCUMENTS

DE      4419940      12/1995
DE      19902234     2/2000
(Continued)

OTHER PUBLICATIONS

Tiziani, H.J. et al., "Three-dimensional imaging sensing by chromatic confocal microscopy," Applied Optics, vol. 33, No. 10, Apr. 1, 1994, pp. 1838-1843.
(Continued)

*Primary Examiner* — Jamil Ahmed
(74) *Attorney, Agent, or Firm* — Downs Rachlin Martin PLLC

(57) ABSTRACT

The invention relates to an apparatus and a method for imaging surface area of a sample having a surface topography with the aid of confocal microscopy, such as confocal Raman and/or fluorescence microscopy. The apparatus comprises a surface topography sensor that provides values for the surface topography. The surface topography values allow for the surface to be maintained in the confocal plane during scanning.

20 Claims, 15 Drawing Sheets

(58) Field of Classification Search
USPC .................. 356/72, 609; 850/3; 600/323
See application file for complete search history.

(56) References Cited

U.S. PATENT DOCUMENTS

2005/0259248 A1* 11/2005 Gip .................. G01N 21/49
356/239.2
2006/0109483 A1* 5/2006 Marx et al. ............... 356/609
2008/0297774 A1 12/2008 Jiang
2009/0270702 A1* 10/2009 Zeng et al. ............... 600/323

FOREIGN PATENT DOCUMENTS

WO      WO 9222805      12/1992
WO      WO 96/30927 A1  10/1996
WO      WO 2010/893984 A2  7/2010

OTHER PUBLICATIONS

Hamilton, D. K., "Surface profile measurement using the confocal microscope," Journal of Applied Physics, vol. 53, No. 7, Jan. 1, 1982, p. 5320.
International Search Report for PCT/EP2011/001837.
International Report on Patentability for PCT PCT/EP2011/001837.

* cited by examiner

4000 μm

10 μm

10 μm

20 μm

US 9,891,418 B2

APPARATUS FOR IMAGING A SAMPLE SURFACE

CLAIM OF PRIORITY

This Application claims priority from German Patent Application Serial No. 10 2010 015 428.5, filed on Apr. 19, 2010, from German Patent Application Serial No. 20 2010 01 0932.9, filed on Aug. 2, 2010, and from PCT Patent Application No PCT/EP2011/001837, filed on Apr. 13, 2011, which Applications are incorporated by reference herein.

FIELD

The invention relates to a device for imaging an area, especially the surface of a sample, by a scanning a plurality of substantially punctiform regions with the assistance of confocal microscopy. In confocal microscopy, a confocal image of the substantially punctiform region of the surface is created by a detector located in the plane of the image. In particular, the invention relates to so-called confocal Raman and/or fluorescence microscopy and devices for confocal florescence and/or Raman microscopy, without being restricted thereto.

In addition to a device for imaging an area, especially a surface, a device is described for determining the topography of a surface that can be imaged with the assistance of confocal microscopy or confocal Raman and/or fluorescence microscopy. With the assistance of Raman measurements or fluorescence measurements, it is possible to excite a sample with a light source such as a laser light source, and image the chemically-different materials of the sample based on the Raman signal or fluorescence signal emitted by the sample.

Background Art

In the case of confocal microscopy, the light from the light source on the way to the sample is conducted through a lens and thereby focused on a substantially punctiform region or point of the sample surface. At the same, the lens can serve to capture the light emitted by the sample, especially the emitted Raman or fluorescence light, and send it to a detector.

With the assistance of the lens, it is also possible to confocally image a point or a substantially punctiform region of the sample substantially perpendicular to the direction of the illumination and/or detection beam path. If the sample, lens, or lighting is moved, it is possible to perform a scan in the x-y direction and thereby scan the entire sample. In confocal imaging, a substantially punctiform light source, preferably a laser light source, is projected onto a focus (Abbe condition) resulting from the wave nature of light, or a substantially punctiform region, ideally on a point of the sample. Subsequently, this picture element is focused preferably using the same optical system, that is the same lens, on a pinhole in front of a detector. Instead of arranging a separate pinhole in front of the detector, it is also possible for the detector itself to be the pinhole. When confocal imaging is used for microscopy, the contrast of the image is substantially increased since only the focal plane of the lens contributes to the image.

In many applications such as Raman and/or fluorescence measurements, confocal measurement possesses advantages since existing flare is strongly suppressed. The problem with confocal measurements or confocal microscopy is, however, that the plane or area to be imaged, especially the surface when scanning a sample, does not remain within the focal plane due to drift, sample unevenness, roughness, and tilt of the sample.

In regard to confocal light microscopy, reference is made to DE 199 02 234 A1 in which a microscope with a confocal lens is described in detail.

A confocal Raman and/or fluorescence microscope is known from DE 102009015945 A1.

An AFM microscope or STM microscope is known from U.S. Pat. No. 5,581,082 that is combined with a confocal microscope. The sample can be scanned with the AFM tip, particularly in the z direction, using the microscope known from U.S. Pat. No. 5,581,082.

Depth information is obtained with the assistance of the AFM tip in U.S. Pat. No. 5,581,082.

During AFM measurement, in particular AFM topography measurement, optical signals are also recorded, thus allowing the topographic data obtained from AFM topography measurement to be correlated with the optical data.

In U.S. Pat. No. 5,581,082, confocal measurement is always performed simultaneous to topographic measurement. A disadvantage of U.S. Pat. No. 5,581,082 is the reduced scanning range which lies within a range of 100 μm to a maximum of 300 μm in the x-y plane. Furthermore, the AFM tip can only provide a maximum range of 5-10 μm of depth information in the z direction.

U.S. Pat. No. 5,581,082 therefore does not permit measurements of samples in the >300 μm range and with a roughness >10 μm.

The problem with confocal microscopy, especially confocal microscopy and/or fluorescence microscopy of surfaces, especially of larger sample areas, especially >300 μm and of technical surfaces, is that imaging is very difficult since there is frequently an insufficient area of sample topography. When scanning in a given plane, a so-called X-Y scan, the sample surface continuously leaves the focal plane of the microscope, making it impossible to easily and completely image the sample surface or the sample.

The object of the invention is therefore to present a device by means of which the disadvantages of the prior art can be avoided. In particular, the invention makes it possible to confocally image a plane or area, especially a surface of a sample, i.e. with the assistance of confocal microscopy. This is also possible with samples having an insufficiently flat sample topography, for example a curved sample.

SUMMARY

According to the invention, this object is achieved in a first aspect of the invention in that a device for imaging a plane or area, especially a sample surface with a topography using confocal microscopy, especially confocal Raman or fluorescence microscopy is provided, wherein values for the topography of the surface are determined with the aid of a surface topography sensor, preferably a non-tactile surface sensor and, with the aid of the surface topography values, the area to be imaged, especially the surface, is brought into the confocal plane during scanning for confocal microscopy, especially Raman and/or fluorescence microscopy.

Determining the surface topography according to the invention, preferably with a nontactile sensor, makes it possible to remain on the surface in a subsequent Raman measurement or to measure a specific depth.

In a first embodiment of the invention (two-step method), the measured topography is saved, processed and then traced.

In a second embodiment of the invention, a control system is used to keep the sample in focus (or a plane parallel thereto) (one-step method).

The plane or area, especially surface, is imaged by means of confocal microscopy, especially Raman and/or fluorescence microscopy by scanning a plurality of substantially punctiform regions of the plane or area, especially a surface, with a device for confocally imaging the substantially punctiform region of the plane or area, especially surface, and a focal plane on a detector.

As described above, the sample can be kept in the confocal plane or focal plane in two ways when the values of the surface topography are known.

In a first embodiment of the invention (two-step method), first the part of the sample to be imaged is scanned, and the values of the surface topography are recorded and then imaged taking into account the surface topography of a sample plane. The values of the surface topography are then used in this device to move the sample such that the plane to be imaged remains in the focal plane of the confocal microscope when scanning the sample with the assistance of the confocal microscope, especially a confocal Raman or fluorescence microscope, independent of the unevenness or curvature of the sample.

In the present application, that which is understood to be the topography of a surface or a sample topography in the current application will be described as a nonexclusive example with reference to a confocal Raman microscope having a confocal chromatic sensor. The sample topography for such an arrangement having a confocal chromatic sensor is understood to be sample units greater than 1 nm, especially greater than 10 nm, and preferably greater than 100 nm.

To be understood as roughness in the present application is sample unevenness substantially in the z direction that cannot be resolved especially due to the lateral extension of the light spot of the confocal chromatic sensor. With a Raman microscope having a confocal chromatic sensor, this would be for example a surface roughness substantially in the z direction of for example less than 100 nm, preferably less than 10 nm and especially less than 1 nm, that is, the sub-μm range.

When imaging a plane, the values of the surface topography can be determined in a first step for a plurality of substantially punctiform regions of the sample, and the surface topography of the sample can be determined therefrom and, in a second step, the sample is moved into the plurality of substantially punctiform regions of the sample and, taking into account the values for the surface topography determined in step 1, into the confocal plane for confocal microscopy. This is a two-step process in which the surface topography is determined first which is followed by confocal microscopy.

In an alternative embodiment, a value is first determined for the surface topography at a substantially punctiform region of the sample, the sample is then moved into the focal plane or confocal plane of the plane to be imaged, and then this region is imaged confocally, for example with the assistance of a confocal Raman or fluorescence microscope. The entire sample can be scanned in this manner. This type of device is characterized in that The sample is the first moved to a substantially punctiform region while scanning, a value is determined for the surface topography, and the sample is moved into the confocal plane with the value for the topography, and the substantially punctiform region is imaged;

After imaging the substantially punctiform region, the sample is moved to another substantially punctiform region in a second step, another value for the surface topography is determined there, the sample is moved into the confocal plane with the additional value for the topography, the substantially punctiform region is imaged, and these steps are repeated until at least part of the plane or area, especially surface, has been scanned.

It is particularly preferable when the values are determined for the surface topography with the assistance of a surface topography sensor, especially a non-tactile surface topography sensor, for example a confocal chromatic sensor.

Although for example a confocal chromatic sensor was cited in the present case as the surface topography sensor, the invention is in no way restricted thereto.

Surface topography sensors can be any kind of contact-free (nontactile) or contacting (tactile) sensors by means of which information can be obtained about the topography of a sample surface.

Examples of tactile sensors are e.g. surface topography sensors that are termed so-called profilometers, or stylus instruments. Examples of contact-free or non-tactile sensors are substantially optical sensors, surface topography sensors based on a white light interferometer, a triangulation sensor or a laser scanning system, or the described confocal chromatic sensor.

A confocal chromatic sensor is distinguished in that the light is imaged at different wavelengths in different focal planes upon irradiation with white light. If the reflected light imaged in different focal planes is imaged on a spectrometer through a pinhole and evaluated with the assistance of a spectrometer, the distance e.g. from the confocal chromatic sensor to the surface of the sample can for example be determined from this signal, and the surface topography can be determined thereby.

The fact is exploited that the wavelength of the focal plane in which the sample surface is located manifests a maximum intensity in a spectrometer. Each wavelength in the spectrometer can therefore be assigned a sample distance. With the assistance of the confocal chromatic sensor, it is therefore possible to quickly and directly determine the topography of the sample purely by optical means.

The confocal chromatic sensor makes it possible to optically determine the sample surface topography and hence scan samples and confocally image the sample surface even when the topography is not sufficiently flat.

It is in particular possible to track the focal plane or confocal plane and thereby use confocal Raman microscopy even when the sample topography is distinct, i.e., not flat, with the assistance of the confocal chromatic sensor, for example using a Raman microscope. In one particular embodiment, a position signal of the surface topography sensor is used to control the confocal plane or focal plane. It is particularly preferable for the confocal chromatic sensor to comprise an optical system, especially a lens system having a large chromatic error. With a lens system, a chromatic error or chromatic aberration is understood to be an error that is caused by the wavelength dependency of the refraction index of the material used for the lenses. Instead of using lenses as the optical component to generate a large chromatic error, diffractive components can be used as the confocal chromatic sensor. Given the wavelength dependency of the diffraction index of the glass of the refractive component, the focal length also depends on the wavelength, that is, the confocal plane lies at different locations for different wavelengths.

In regard to confocal chromatic sensors, reference is made to the confocal chromatic sensors of Micro-Epsilon Messtechnik GmbH & Co. KG, Konigsbacher Straße 15, 94496 Ortenburg, Germany (www.micro-epsilon.de), the entire content disclosed by the website being included in the application. Confocal chromatic sensors are particularly suitable for measuring distance with a resolution within a range greater than 1 nm to 1 µm, preferably greater than 1 nm to 100 nm, since they do not have to be refocused due to their high measuring precision and simultaneous large measuring range that extends for example from 100 µm to 40 mm, especially from 120 µm to 21 mm, and most preferably from 40 µm to 12 mm. The size of the light spot in the x-y plane preferably ranges from 0.1 µm to 1 mm, preferably 7 µm to 150 µm, in particular 10 µm to 100 µm, depending on the measuring range, and it has large working distance of greater than 100 µm to 200 mm depending on the sensor.

As been described before with reference to the first device, the sample surface can first be measured in a two-step process with a confocal chromatic sensor, and then this topography can be traced in a confocal optical measurement, for example with confocal Raman microscopy. A predetermined plane of a sample such as the surface can thereby be confocally imaged.

The light of a non-monochromatic, preferably broadband light source is guided through the refractive lens system of the confocal chromatic sensor as a light spot to the substantially punctiform region of the sample surface where it is reflected by the sample, and collected and evaluated with the assistance of a spectrometer, and the wavelength with the focal plane in which the sample surface lies manifests a maximum intensity in the spectrum. The non-monochromatic, preferably broadband light source is preferably a white light source, that is, a broadband light source within the visible wavelength range. Broadband light sources would also be possible that do not emit visible light, for example in the IR wavelength range, or in the ultraviolet wavelength range. Illuminating the sample surface in this way would make it possible to decouple the beam paths from the confocal chromatic sensor and e.g. Raman microscope and use the same lens for the chromatic sensor and for the Raman measurements using the Raman microscope.

This makes it possible to determine the distance from the sensor to the sample surface with the assistance of the spectrometer since each wavelength can be assigned precisely one sample distance.

In addition to determining the values of the surface topography with the assistance of a confocal chromatic sensor, other options are also conceivable. For example, it would also be possible not to determine the surface topography with the assistance of a confocal chromatic sensor; instead, the sample could also be periodically moved e.g. in the z direction. The sample would therefore be periodically moved through the focus in the z direction. By periodically moving the sample, an average in the direction perpendicular to the sample surface, i.e., in the z direction, can be obtained and hence an increasingly sharper image of the sample surface with a relatively even intensity. This device has also been termed an extended focus device. It is however necessary to adapt the modulation depth of the movement to the roughness or topography of the sample.

Moving the sample to determine the focus as described above, so-called extended focus measurement, can also be combined with automatic focus tracking. The center of the modulation, i.e. the periodic movement, is tracked in the z direction so that an excessively large modulation depth does not have to be chosen for very rough samples. The fact is exploited that the focus of the light source moves through the surface during modulation. The signal that is detected is similar to a Gaussian curve with the location of its maximum corresponding to the ideal focus on the surface.

If the position of maximum intensity is sent to a controller, the center of the modulation can be tracked. The topography of the sample can be determined by using this type of measurement since the maximum intensity of the modulated signal corresponds to the sample topography.

The movement of the sample in the z direction to compensate for surface roughness can also be superimposed on the tracking of the sample with reference to the surface topography determined with the assistance of a confocal chromatic sensor. Combining both devices allows the surface topography of a sample to be taken into account and simultaneously compensate for surface roughness. An example of such tracking is shown in detail in FIG. 6 of the application. Reference is made to the description therein.

It is particularly preferable for the confocal Raman microscope and/or fluorescence microscope to comprise a light source to excite light emission in the sample, as well as a detector to detect the photons emitted by the light emission, in particular the emitted Raman and/or fluorescence photons.

In addition to this device, the invention also makes available a device for imaging the surface of the sample by scanning a plurality of substantially punctiform regions of the surface, comprising an apparatus for confocally imaging the substantially punctiform region of the surface in a focal plane on a detector, wherein the device preferably has a surface topography sensor. In one embodiment, the surface topography sensor can an independent apparatus. This is however not essential to the invention. Any type of sensor is suitable as the surface topography sensor by means of which it is possible to measure the surface topography, i.e., the deviation, e.g. of a sample surface, from the sample plane in the direction perpendicular to the sample surface, i.e. in the z direction. Such surface topography sensors can be both contact-free and non-contact free, i.e., tactile, surface topography sensors. Examples of tactile surface topography sensors are mechanical profilometers, AtomicForce microscopes (AFM microscope), for example, the AFM microscope alpha 0A by WiTec GmbH or stylus instruments.

Examples of contact-free surface topographies are in particular optical sensors such as white light interferometers, triangulation sensors, laser scanning systems that for example use confocal microscopy, and confocal chromatic sensors.

When the surface topography sensor is an optical sensor, it has an independent beam path in a first embodiment next to the apparatus for confocally imaging the substantially punctiform region of the surface.

In a second embodiment of the invention, the excitation focus of the laser for the Raman measurement is guided through the same lens as the excitation focus of the surface topography sensor. In a preferred embodiment of the invention, the light of the confocal Raman and/or fluorescence microscope lies within a first wavelength range and the light of the confocal chromatic sensor lies in a second wavelength range, and it is particularly preferable when the first and second wavelength range do not overlap. When the wavelength ranges do not overlap, they are preferably selected so that the first wavelength range is defined by a the limits of the emitted luminescence spectrum and/or Raman spectrum of the quantity to be investigated, and the second wavelength lies above or below the first wavelength range without overlapping the first wavelength range. For example, the first wavelength range for the emitted luminescence or Raman spectrum of the sample to be investigated can lie within a range of 500 nm to 1100 nm, and especially 532 nm to 650 nm. The second wavelength range extends from 350 nm to 500 nm, and preferably from 400 nm to 500 nm.

If a tactile device for determining the surface topography is combined with a confocal optical microscope such as a confocal Raman microscope, one tactile device suitable for being combined with the Raman microscope is the atomic force microscope (AFM).

In regard to AFM microscopy, reference is made to WO 02/48644 A1 that discloses such an AFM. With an AFM, the sample surface is scanned with the assistance of a scanning probe in the form of a tip.

The content disclosed in WO 02/48644 is completed incorporated in the present application by reference.

As described above, in confocal microscopy, the light from a monochromatic light source is guided on the path to the sample through a lens and is thereby substantially focused on a point of the sample surface. If the device is in particular a confocal Raman microscope, a spectrometer can break down the light spectrally that is emitted by the sample, i.e., the Raman or fluorescent light. Such a spectral break down can be done in a spectrometer, for example using a grating or a prism. If the light broken down in this manner is captured with a CCD camera, it is possible to capture the entire spectrum of the Raman or fluorescent light scattered by the sample. The advantage of spectrally breaking down the Raman light with a Raman microscope is that any spectral range can be selected to be measured by the detector for example by rotating the grid.

The device, especially the confocal microscope, preferably the confocal Raman and/or confocal fluorescence microscope, can have a movable sample table that makes it possible to image the sample surface for example by moving the sample. Alternately or in addition, the excitation light source for the detector can be moved to obtain an image of the sample. It is also possible to record spatial maps of spectral properties of the sample. A very high depth resolution is achieved, in particular with a confocal image. The moveability of the sample table makes it possible to scan the sample or sample region.

As described above, the confocal chromatic sensor is generally also arranged in addition to the imaging device, i.e., with its own beam path.

The surface topography determined for example with the assistance of a confocal optical sensor is generally used in downstream or simultaneous Raman measurement to keep the sample surface continuously within the focal plane of the lens while sampling, e.g. within the plane for confocal Raman microscopy. The X-V scan of the sample is expanded into an X-Y-Z scan, the Z scan serving to compensate for the sample topography.

BRIEF DESCRIPTION OF THE DRAWINGS

The invention will be described in detail below with reference to exemplary embodiments: The following are shown.

DETAILED DESCRIPTION

Although the present invention will be described below with reference to exemplary embodiments of a device for imaging a sample surface, especially by means of scattered Raman light, a so-called confocal Raman microscope, the invention is not limited thereto. Rather, it comprises all confocal microscopes, in particular also confocal light microscopes or fluorescent microscopes. A chromatic sensor can also be used for such a confocal microscope to track the confocal plane when the surface topography of the sample to be investigated is pronounced.

Figure 1A:
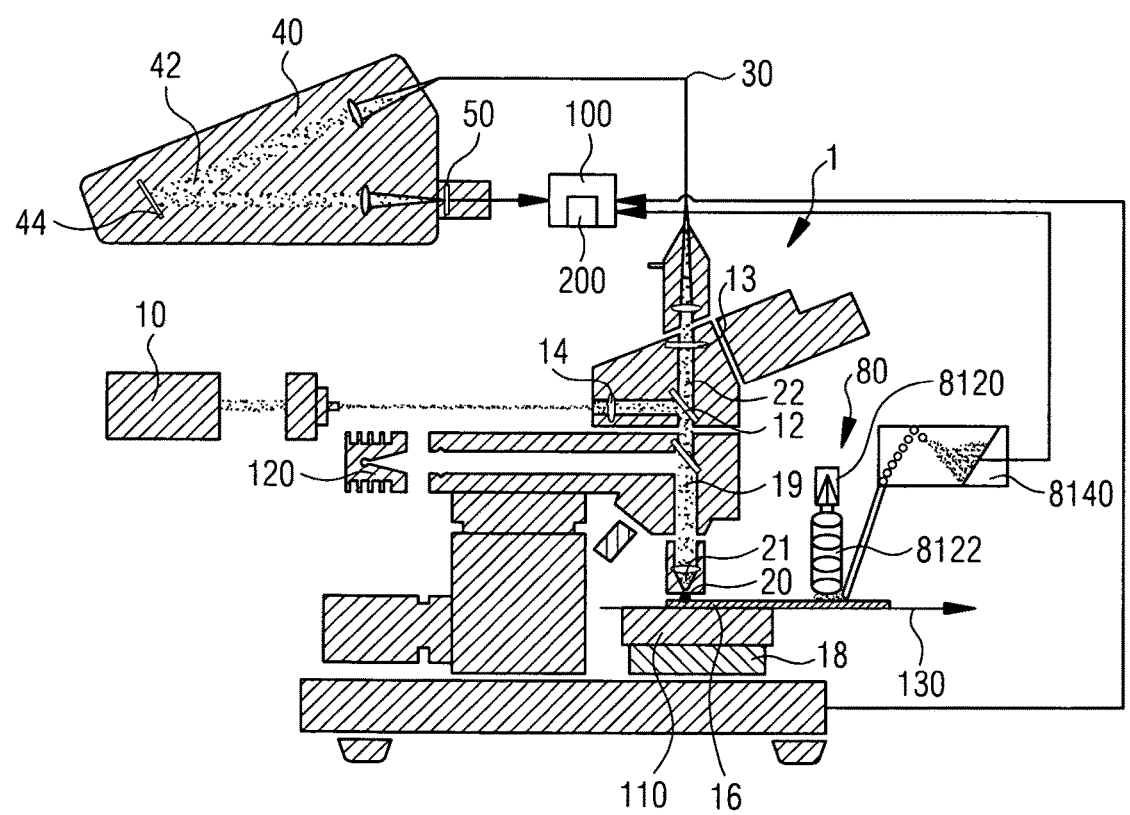
FIG. 1a The basic design of a Raman microscope having a surface topography sensor, in particular an optical surface topography sensor, where the beam path of the surface topography sensor is different from the beam path of the Raman microscope.

FIG. 1a shows the basic design of a first embodiment of a confocal Raman microscope for recording a sample surface. With the assistance of confocal Raman microscopy, chemical properties and phases of liquid and solid components can be analyzed down to the range of resolution limited by diffraction of approximately 200 nm. It is unnecessary to mark the sample, for example using fluorescent substances as in fluorescence microscopy. By means of the confocal design, depth resolution is provided that makes it possible to analyze the depth of the sample without for example having to create sections.

With confocal microscopy, a punctiform light source, preferably a laser, is imaged on a point of the sample. Then this pixel is preferably focused preferably using the same lens on a pinhole in front of a detector. The size of the pinhole needs to be adapted to the image of the light pattern limited by diffraction. The image is generated by scanning a point from the illumination source over the sample; the sample is accordingly scanned point for point. The image contrast is significantly increased with this type of imaging since only the focal plane of the lens contributes to the imaging. In addition, the resolution can be reduced with the aperture of the pinhole to approximately $\lambda/3$ by approximately a factor of $\sqrt{2}$ due to the convolution of the refraction point. In addition, a three-dimensional image of the sample structure can be obtained with an axial resolution of approximately one wavelength.

In regard to confocal microscopy, reference is for example made to DE 199 02 234 A1.

FIG. 1a shows a possible design of a confocal Raman microscope, for example the microscope alpha300 R by Witec GmbH, 0-89081 Ulm, in Germany. With the confocal Raman microscope 1, the light from a light source 10 is directed after beam expansion 14 by a beam splitter mirror 12 toward the sample 16 on the sample table 18. The deflected light beam 19 is focused by a suitable lens 21 on a substantially punctiform region 20 on the sample 16. The light from the laser interacts with the material of the sample 16. Reflected Rayleigh light arises from the sample at the same wavelength as the incident light. This line is deflected by a beam splitter 12 to a cut-off filter or notch filter 13 and does not reach the detection lens.

The light that has (a) different frequency/frequencies than the Rayleigh light emitted from the sample, that is, the Raman light, passes through the beam splitter 12. After the beam splitter 12, the Raman light is identified with reference number 22. By means of a pinhole (not shown), the Raman light 22 is coupled into a light conducting fiber 30 and reaches a spectrometer 40. In the spectrometer 40, the beam of Raman light is further expanded with a suitable lens to produce the beam 42 that contacts a grating spectral filter 44. The grating spectral filter 44 bends the light in different directions corresponding to its wavelength so that a spectral signal can be recorded on the CCO chip 50 depending on the location. The CCD chip 50 has for example, 1024 channels which allows the 124 channels of the CCO chip to record light at different wavelengths.

The image of the sample arises by scanning in the x-/y plane in the direction of the arrow 130.

For adjustment or observation, light from a white light source 120 can also be directed toward the sample 16.

The confocal Raman microscope 1 also comprises a confocal chromatic sensor 80. The confocal chromatic sensor 80 is designed in addition to the confocal Raman microscope 1. In the portrayed embodiment according to FIG. 1a, the confocal chromatic sensor comprises its own beam path independent from the Raman microscope 1. Consequently, the confocal chromatic sensor 80 has its own white light source 8120, a refractive optical element 8122, an optical arrangement for recording the light reflected from the sample, and a light-sensitive sensor unit that can recognize and evaluate the associated spectral color such as a spectrometer.

The light from the white light source 8120 passes through the lens system with a high chromatic error of the refractive optical element. The incident white light is imaged in different focal planes depending on the wavelength. The light imaged in different focal planes is reflected by the sample 16, e.g. recorded by the lens, and then fed to the spectrometer 8140 as a sensor component. With the assistance of the spectrometer 8140, the signal can be evaluated, and the distance from the refractive optical element 8122 of the confocal chromatic sensor 80 to the surface of the sample 16 can be determined from this signal, and hence the surface topography can be determined.

The fact is exploited that the wavelength of the focal plane in which the sample surface is located manifests a maximum intensity in a spectrometer. By determining the intensities, each wavelength in the spectrometer 8140 can be assigned a sample distance, that is, the distance from the sample 16 to the refractive optical element 8122. With the assistance of the confocal chromatics sensor 80, it is hence possible to determine the topography of the sample perpendicular to the sample plane, that is, in the z direction, quickly and directly in a purely optical manner, that is, without time-consuming scanning.

The confocal chromatic sensor 80 therefore enables the sample surface topography to be optically determined.

Figure 1B:
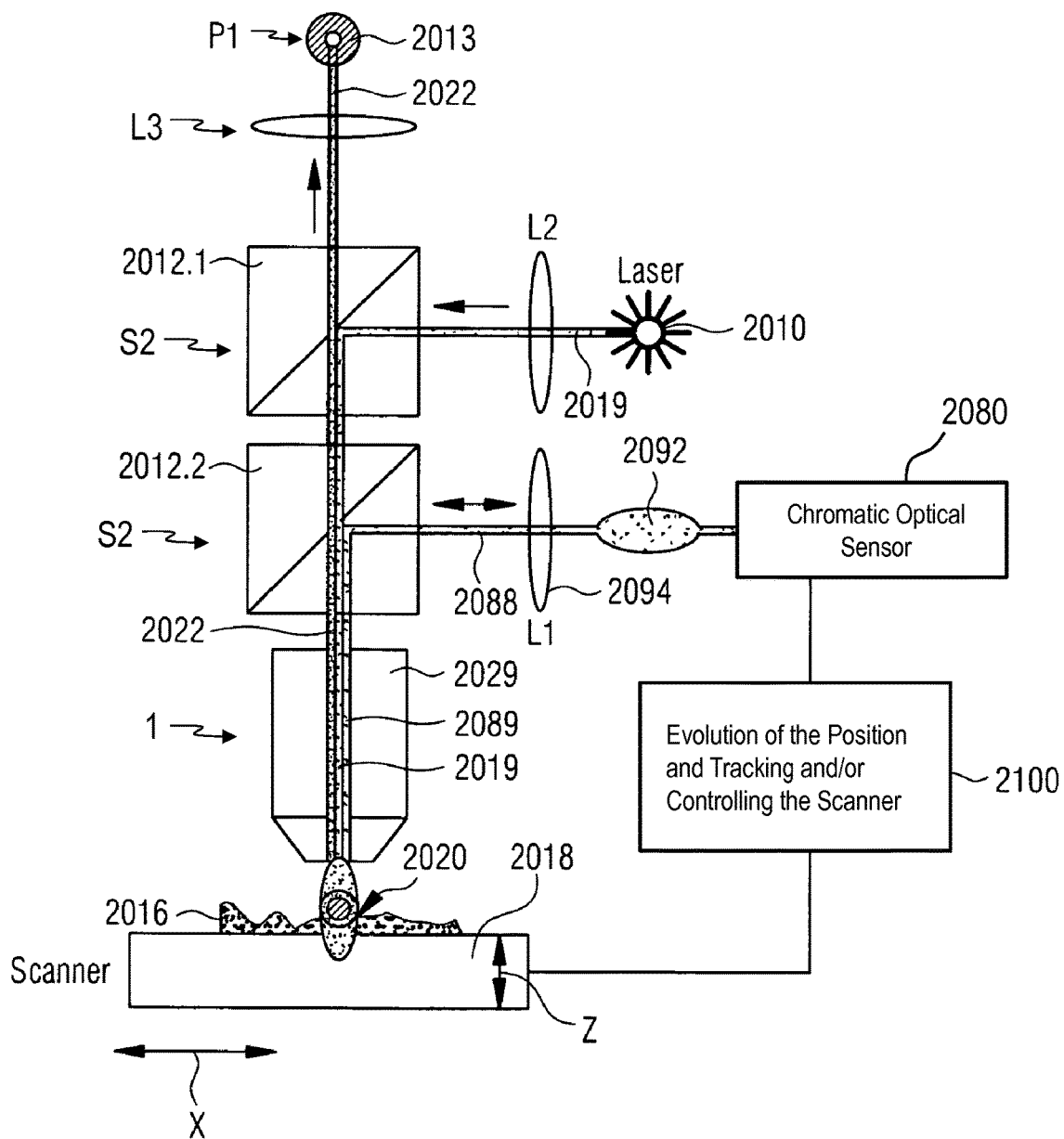
FIG. 1b The basic design of a Raman microscope having an optical surface topography sensor, the excitation focus of the laser for Raman measurement being guided through the same lens as the excitation focus of the optical surface topography sensor.

Although the chromatic sensor has its own beam path in the present exemplary embodiment in FIG. 1, this is not essential. In an alternative embodiment according to FIG. 1b, the beam path of the confocal chromatic sensor can also be integrated in that of the confocal microscope, for example, the confocal Raman microscope.

FIG. 1b shows the basic design of a confocal Raman microscope where the excitation beam of the light source, or the laser for Raman measurement, is guided parallel to the excitation beam for measuring topography according to a second exemplary embodiment of the invention. The same components in FIG. 1a above are identified with reference numbers increased by 2000. With the Raman microscope 01 shown in FIG. 1b, both the light from the light source 2010 for exciting the Raman light as well as the light of the confocal chromatic sensor 2080 is focused by the same lens 2029 on substantially the same region 2020 of the sample 16. The focus position for Raman measurement, i.e., the confocal focus of excitation laser light from the light source 2010 for exciting the Raman effect can be selected within the measuring range of the confocal chromatic sensor. The light from the light source 2010 is fed by means of a beam splitter 2012.1 in the direction of the sample 2016. The light beam 2019 is deflected in the beam splitter 2012.1 toward the sample 2016 and passes through another beam splitter 2012.2. The Raman light generated by the sample from interaction passes through beam divider 2012.1 and beam divider 2012.2 and, following divider 2012.2, is identified as 2022. Following beam divider 2012.2, the light beam 2022 is focused on a pinhole 2013 before a detector (not shown). The ellipsoid 2092 that is shown in the light path between the chromatic sensor 2080 and the lens 2094 indicates the spatial distribution of the focal planes of the chromatic sensor 2080. This is imaged by the lens 2094 and the lens 2029 on the sample 2016. The ellipsoid is compressed by reducing this lens system consisting of lens 2094 and lens 2029. In the detector, the Raman light is for example detected broken up spectrally. In addition to the light from the light source 2010 that serves to excite the Raman effect in the sample, the light from the light source (not shown) of the confocal chromatic sensor 2080 is sent by the other beam divider 2012.2 through the same lens 2029 as the light for exciting the Raman on the sample 2016. The light beam is designated as 2019. The white light from the light source of the confocal chromatic sensor that is directed toward the sample is designated as 2088. The white light radiating toward the sample is imaged in different focal planes depending on the wavelength and is reflected by the sample. The reflected light 2089 is deflected by the other beam divider 12.2 to the confocal chromatic sensor 2080 and evaluated to determine the surface topography.

Since both of the light to excite the Raman effect, as well as the confocal chromatic sensor can pass through the same lens, it is advantageous when either different spectral ranges or a time-division multiplex device is used. For example, the light of the chromatic optical sensor can lie within a wavelength range of 400 nm to 500 nm, and the light wavelength for exciting the Raman effect can be 532 nm. Such an arrangement would allow Raman spectra generally above 532 nm to be detected. Of course, it would also be conceivable to choose other wavelengths. As an alternative to two different wavelength ranges, the measurements can also alternate sequentially over time and be evaluated in a time-division multiplex device.

The design shown in FIG. 1b enables the topography of a sample surface to be tracked with the assistance of the confocal chromatic sensor 2080, wherein the excitation focus of the later for Raman measurement is guided parallel to the topography. The focus position of the laser on the sample can be adjusted anywhere within the reception range of the chromatic sensor 2080. The scanner or stepping motor can be tracked by means of a controller or an actuator. In the second case, the chromatic optical sensor 2080 can be calibrated for the high resolution lens 2029.

In addition to Raman measurement, pure topographic measurement is possible using a high-resolution lens 2029 since the lateral resolution of the chromatic optical sensor improves by the factor of reduction when the image is reduced.

At the same time, the topographic resolution improves.

Such contact-free topographic measurement is particularly suitable for samples with a topography that is too high for AFM (>5 μm), or with lateral structures that are much larger than the typical scanning ranges of piezo scanners (100 μm).

Figure 1C:
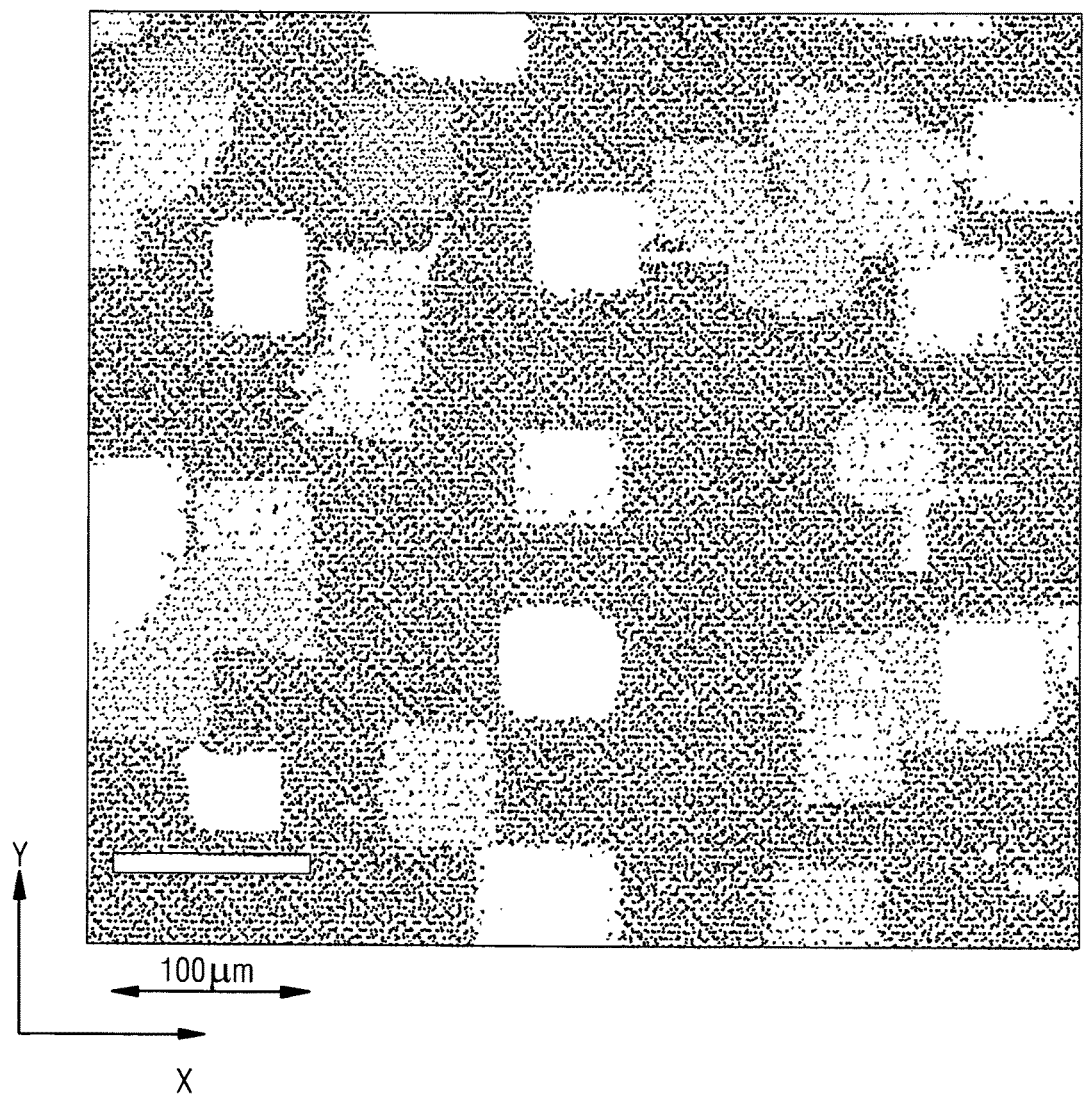
FIG. 1c A topographic measurement of a sample using the device according to FIG. 1b FIG. 2 A topography of a coin measured using a device with a confocal chromatic sensor.

FIG. 1c shows a topographic image that was recorded using a chromatic optical sensor through a high-resolution lens (50×/NA=0.8). The scanning range is 500 μm×500 μm, and the color scale (black to white) extends from 0-5 μm. In this image, the scanning table was controlled in the z direction, that is, perpendicular to the sample surface, with the assistance of the position signal of the chromatic optical sensor 2080. With such a control, the excitation laser is always held at the same distance from the sample surface during simultaneous Raman measurement.

The lateral shift, that is, the shift of the sample table in the x and y direction, was executed by stepping motors.

The detected light of the topographic or Raman measurement according to FIGS. 1a and 1b is transmitted with the assistance of e.g. a CCD chip 50 to an evaluation unit 2100. The evaluation unit 100, 2100 is part of the controls for the sample table 18, 2018. The precise positions in the x, y and z directions of the sample table 18, 2018 are detected by the evaluation unit 100, 2100. In general, the sample 16,2016 is scanned by moving the sample table designed as a shuttle table 110,2110. The shuttle table can be designed as a piezo table. The shuttle table 110 with the samples arranged thereupon can be shifted in the x, y and z direction by means of piezo elements.

The surface topography or the image of the sample is determined by scanning in the x-y plane. The light source or the optical fiber and/or the sample can be moved. Once the surface topography is first determined, the values for the surface topography are recorded, assigned to the respective, substantially punctiform regions, and saved. After the entire sample has been scanned and the values have been determined for the surface topography, the sample is moved at least to a part of the substantially punctiform areas for which the surface topography values were determined in order to perform Raman and/or fluorescence measurements at these points taking into account the surface topography. This process is hence a so-called two pass process, i.e., the topography and Raman measurements are sequential. With this device, small modulations along the topography can also be performed to take into account the roughness of the sample.

Figure 2:
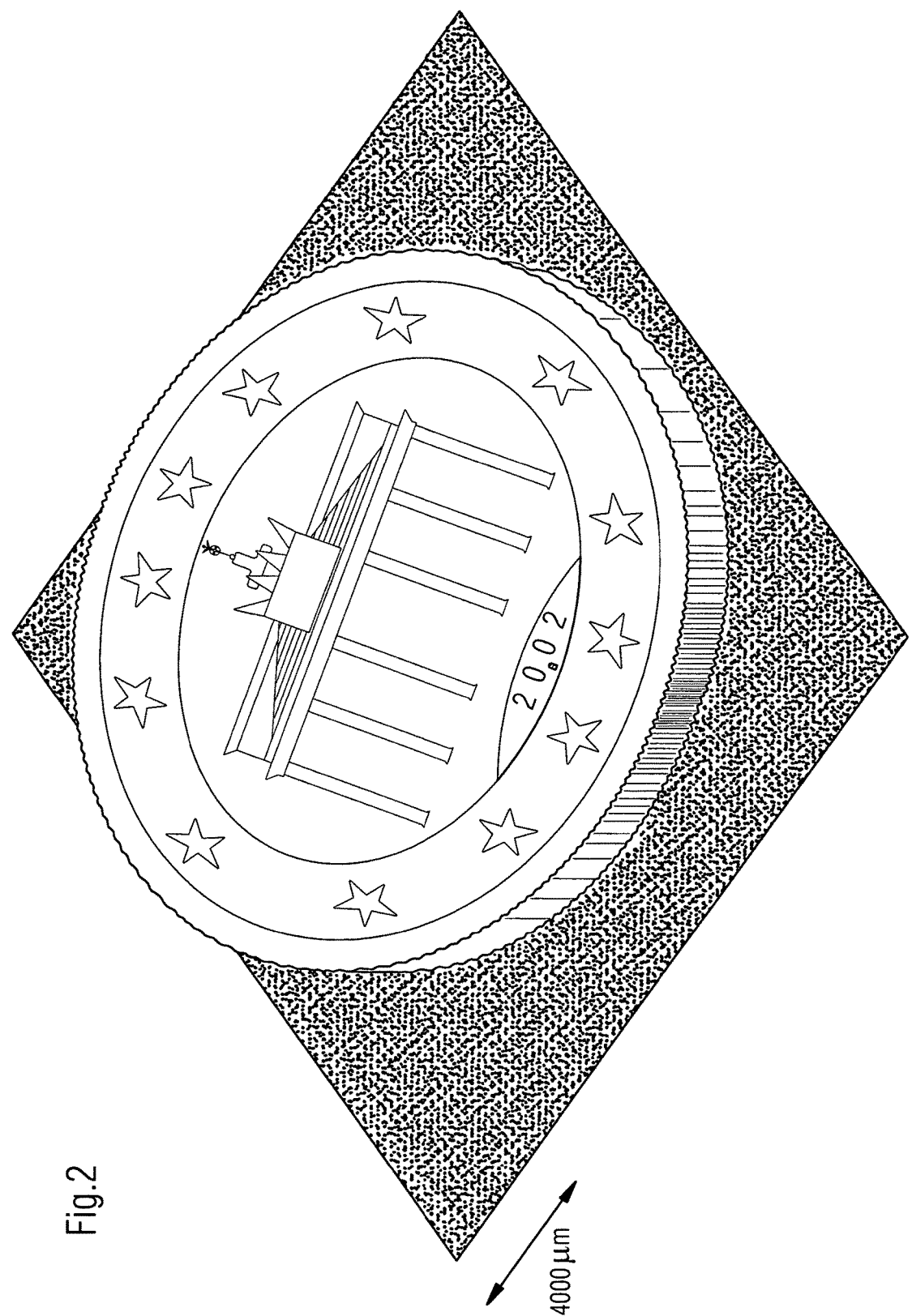
Figure 3:
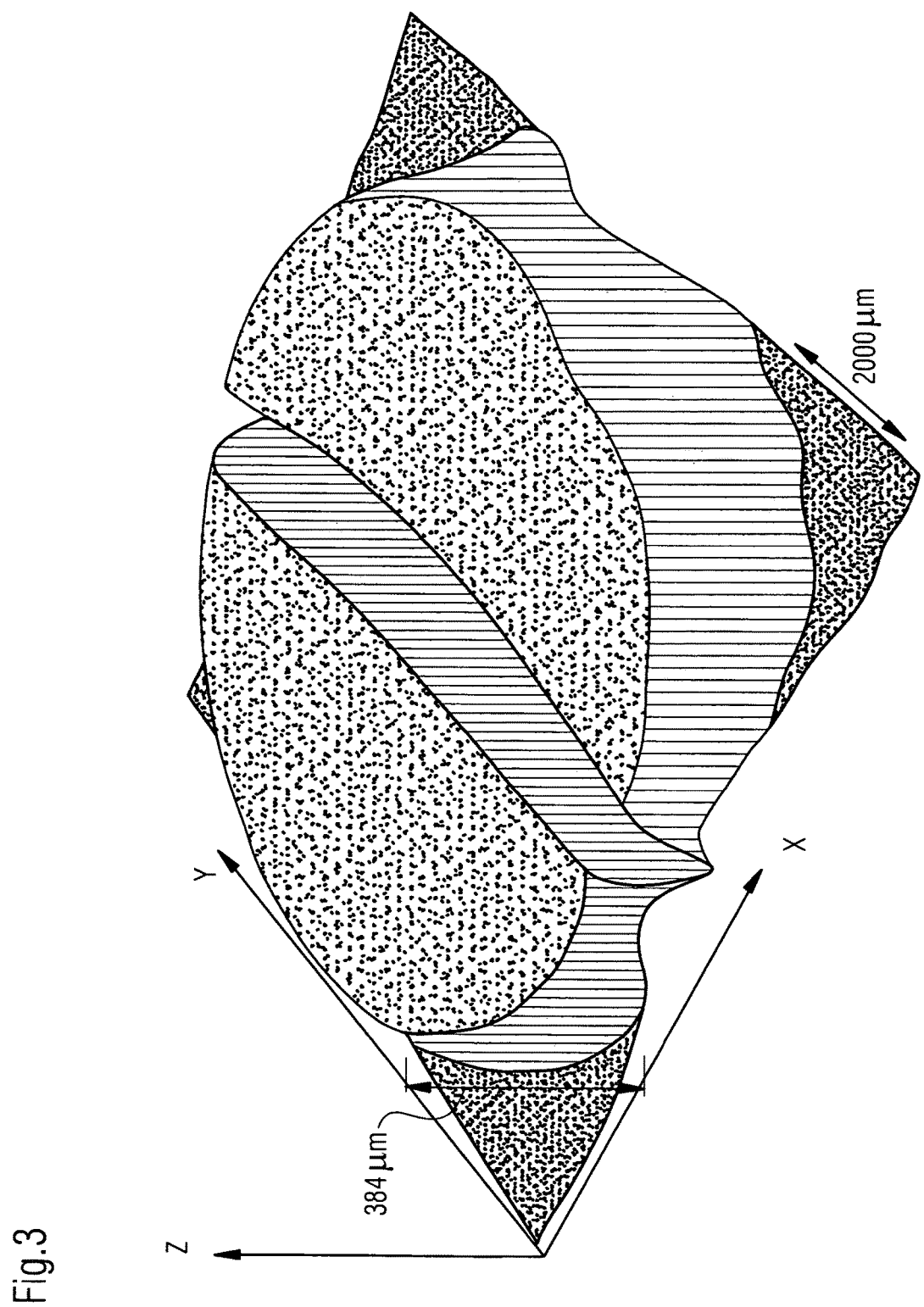
FIG. 3 A topographic image of a tablet superimposed with information from Raman microscopy.

If e.g. Raman data are also collected in addition to the topography, i.e., the topography signal is used to control the focal plane for the Raman signal, the process is a one-step process. FIGS. 2 and 3 which follow show the difference between a pure topographic image (FIG. 2) and an image obtained in a single-step method that shows the surface topography with additional Raman information (FIG. 3).

FIG. 2 shows the topography of a 10 cent coin measured using a confocal chromatic sensor (reference number 80 FIG. 1). The x-y plane is also indicated in which the scan was performed.

The topography extends in the z direction. By means of the chromatic sensor 80, 2080 according to FIGS. 1a and 1b with which white light is directed through the refractive optical element to the sample in the x-y plane, light of different wavelengths is imaged in different focal planes due to the large chromatic error of the refractive lens system of the chromatic sensor 80, 2080. If light reflected by the sample 16 is spectrally analyzed, for example in a spectrometer, information about the distance between the sensor and sample surface can be inferred from the intensity distribution. The wavelength with a focal plane in which the sample surface is located manifests a maximum intensity in the spectrum. When the sample is scanned in the x-y direction, the wavelength at which the maximum intensity is manifested can be determined for each largely punctiform region of the sample. The distance between the chromatic sensor and the surface, and hence the surface topography, can be inferred from the wavelength on the basis of the chromatic error.

The topographic image is then obtained by scanning in the x-y direction. If it is found e.g. at one point that the wavelength at which maximum intensity occurs is 500 nm, and it is e.g. 550 nm at another location on the sample, the one region is e.g. increased with reference to the other reason.

The image shown in FIG. 2 is a such a purely topographic image of the sample surface, that is, FIG. 2 only portrays the surface topography using a chromatic sensor without any information on the substances of the surface that for example can be determined by means of Raman or fluorescence measurements.

In contrast, FIG. 3 shows a picture of a surface where Raman data was recorded with a confocal Raman microscope in addition to the surface topography that was determined by means of the chromatic sensor. Both the x/y direction and z direction are indicated.

Measurements are taken every 12 mm in the x/y direction, and 384 μm in the z direction.

The investigated surface is the surface of a tablet. The distribution of the active ingredient in the tablet itself was determined by means of Raman spectra.

With the assistance of the topographic image, the sample surface is held continually within the focal plane of a Raman lens simultaneous to the Raman measurements. This yields FIG. 3.

With the image according to FIG. 3, the information obtained about the active ingredient distribution with the first Raman spectra are added to the topographic image.

FIG. 3 shows a picture in which, for the first time, the distribution of an active ingredient could be determined in a sample that is not flat.

Figure 4:
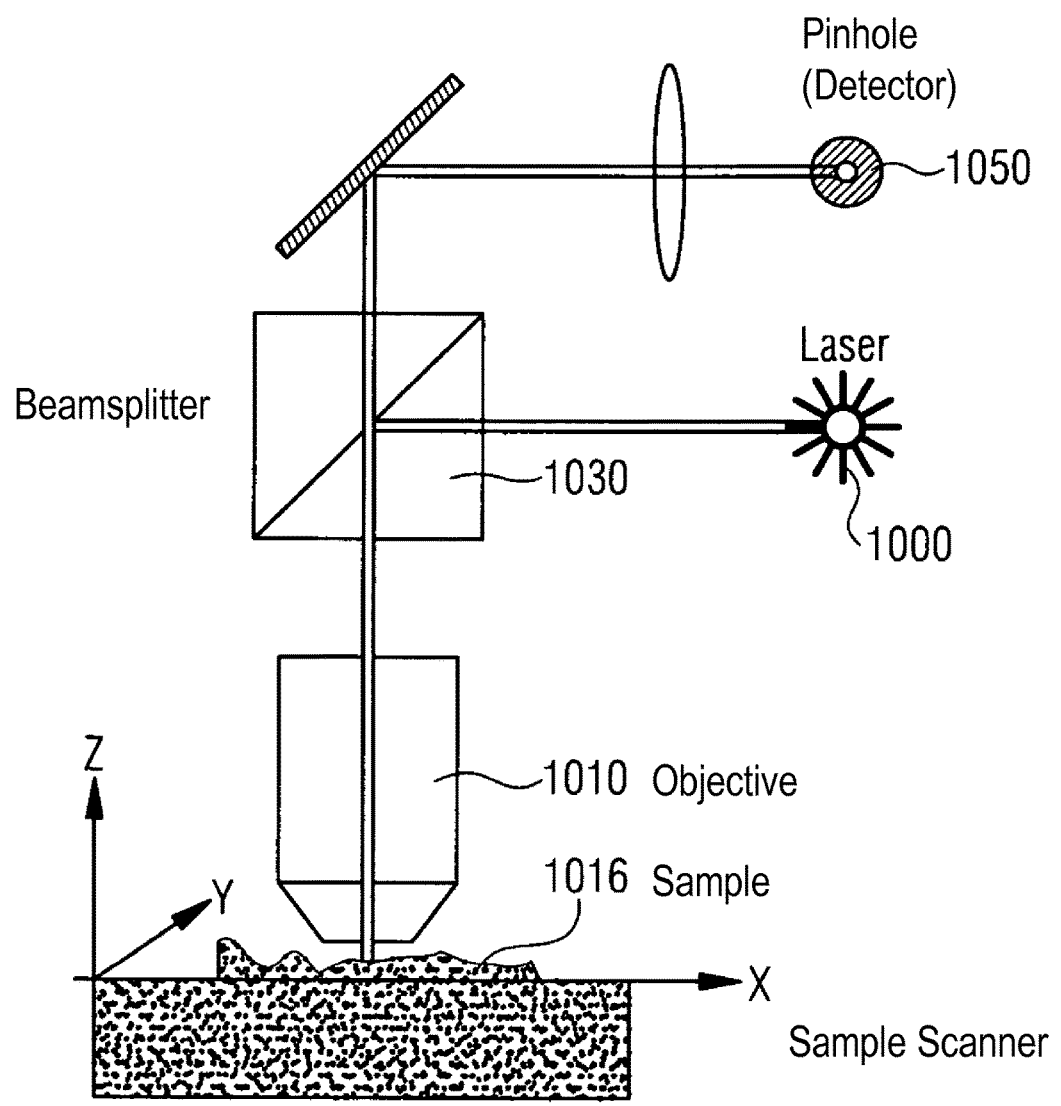
FIG. 4 An optical beam path for extended focus measurement and automatic focus tracking.

Instead of determining the surface topography by means of chromatic sensors, it is also possible to periodically move the sample in the z direction. The sample is therefore moved through the focus in the z direction. If the surface topography is for example only generated by the roughness of the sample, at least an average of the Raman spectra in an averaged x/y plane can be obtained by moving the sample, thereby yielding a sharp image of the sample surface with relatively even intensity. FIG. 4 shows the optical beam path of a system in which the sample is moved periodically in the z direction.

The excitation light is provided by a light source 1000 and directed by the lens 1010 to the sample surface 1016. The light generated by this excitation, i.e., the reflected, emitted or scattered light, is directed by the beam splitter 1030 to the detector 1050 such as a CCD camera. The generation of Raman light is a scattering process.

While the sample is being moved to different locations in the x/y direction and the image of the sample is being generated by scanning in the x/y direction, the sample is also periodically moved in the z direction. When the sample is periodically moved in the z direction, the sample is continuously moved through the confocal focus plane. Sample roughness can be averaged therefrom.

Figure 5A:
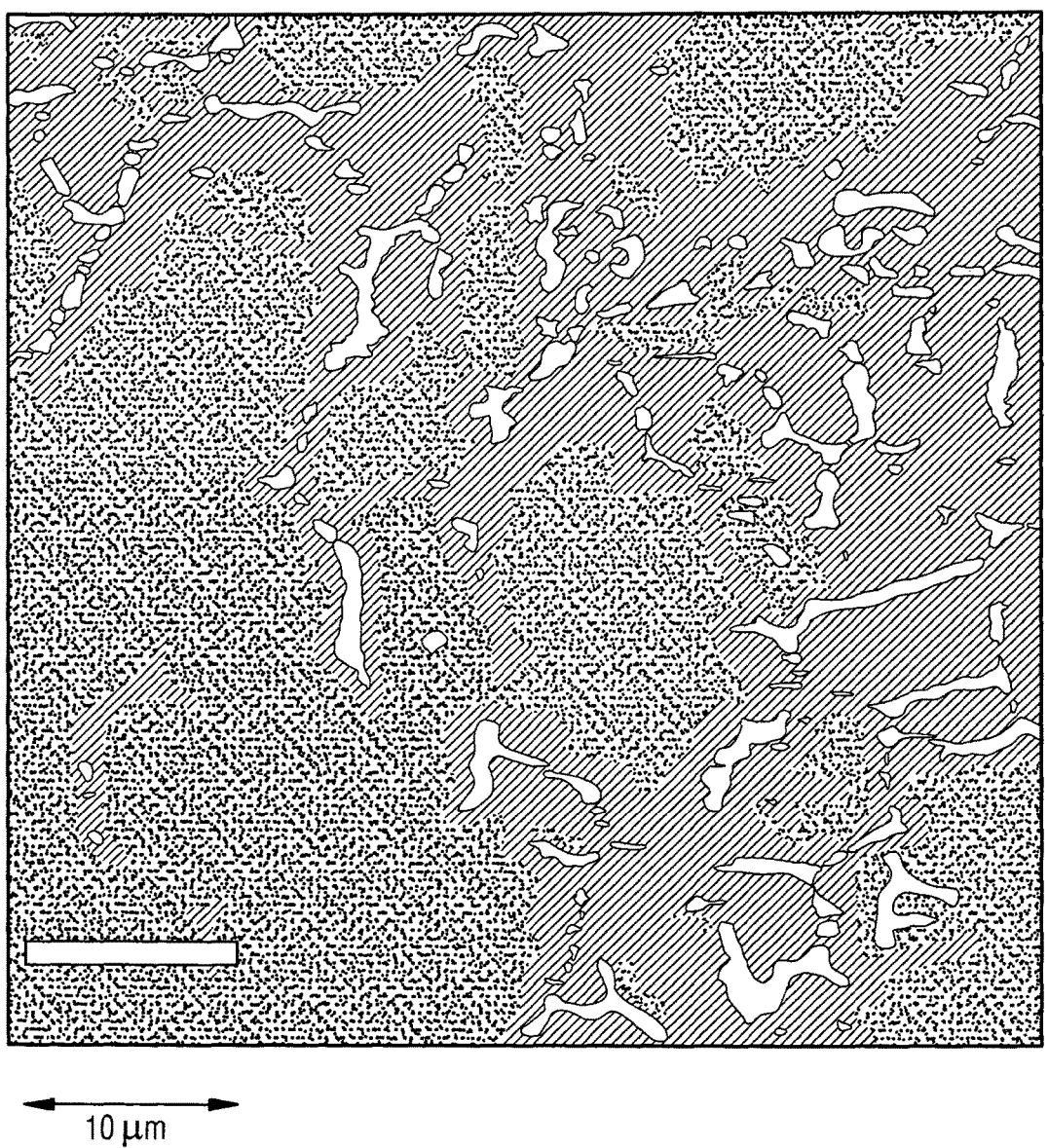
FIGS. 5a-5b A picture of a rough silicon surface as a confocal Raman image (FIG. 5a), and as a confocal Raman image where the sample or lens is periodically moved in the z direction (FIG. b)
Figure 5B:
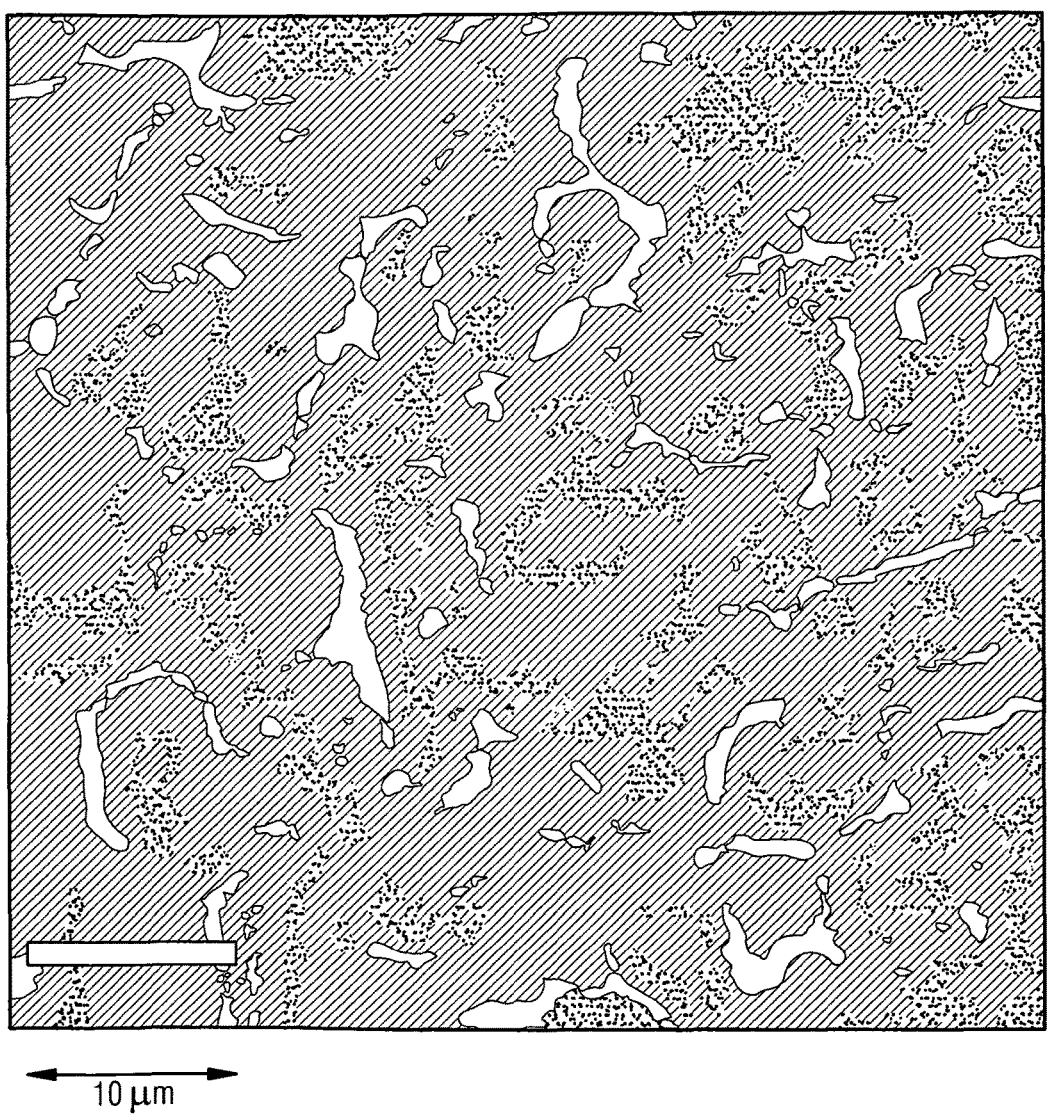

As can be seen in FIGS. 5*a* to 5*b*, a signal for confocal Raman measurement can be obtained by moving in the z direction, even when the surface is rough. This will be explained below.

FIG. 5*a* shows confocal Raman measurement without modulation in the z direction.

Since many regions in FIG. 5*a* do not lie in the focus due to the roughness of the sample, many regions of the image are dark, that is, without a signal.

When modulation is incorporated, that is, movement in the z direction, the dark regions disappear and, as shown in FIG. 5*b*, a consistently sharp image is obtained with even intensity.

If the modulation amplitude is large enough, i.e., greater than the highest sample topography, the topography can be determined by locating the position of the maximum Raman and/or Raleigh intensity in each modulation period. In such an instance, a confocal chromatic sensor is unnecessary. This method is an alternative method for determining or compensating the topography. The advantage is that it is a single-past process, i.e. the Raman measurement and topography measurement are simultaneous. At large amplitudes, the focus only lies within the area of the sample surface for a small part of the modulation amplitude which can lead to inefficient exploitation of the Raman measuring time.

To optimally exploit the measuring time, smaller modulation amplitudes can be used. In such a case, a control system ensures that the modulation always occurs at the last found topographic value, i.e., the modulation in the z direction is used for the automatic confocal tracking of the focus. A signal characteristic for such tracking is shown in FIG. 6.

Figure 6:
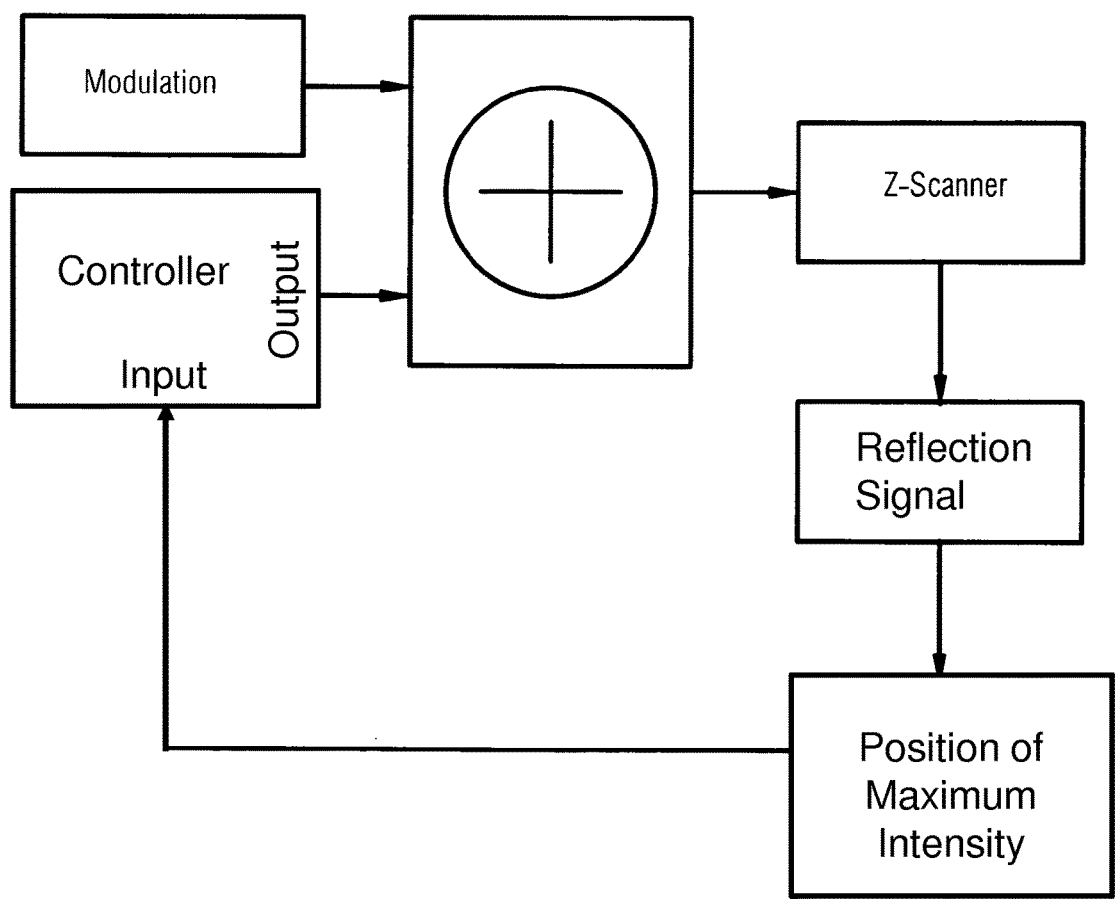
FIG. 6 A diagram of a control loop for automatic focus tracking.
Figure 7A:
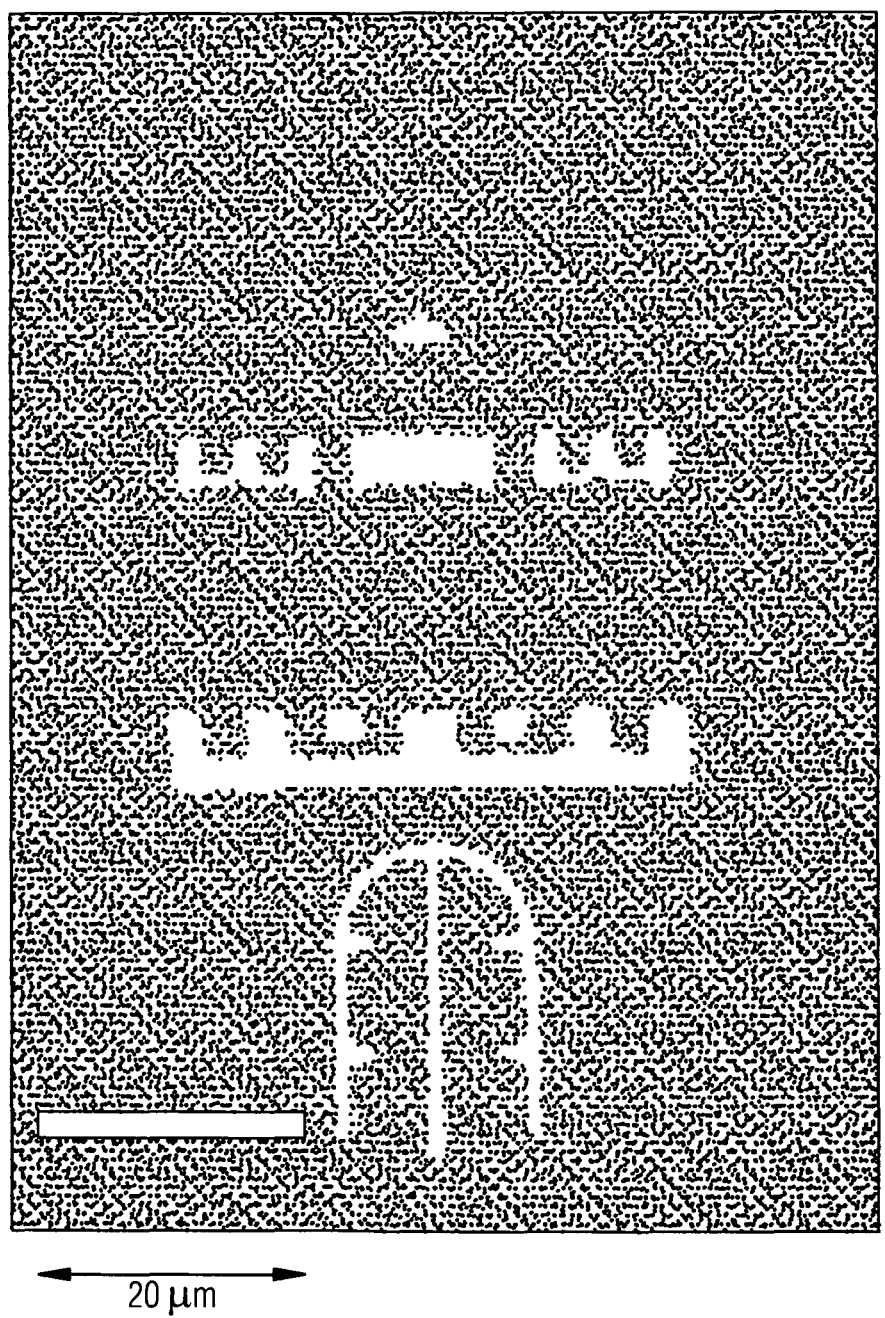
FIG. 7a-7b A measurement with confocal automatic focus tracking as an optical image and topographic image.
Figure 7B:
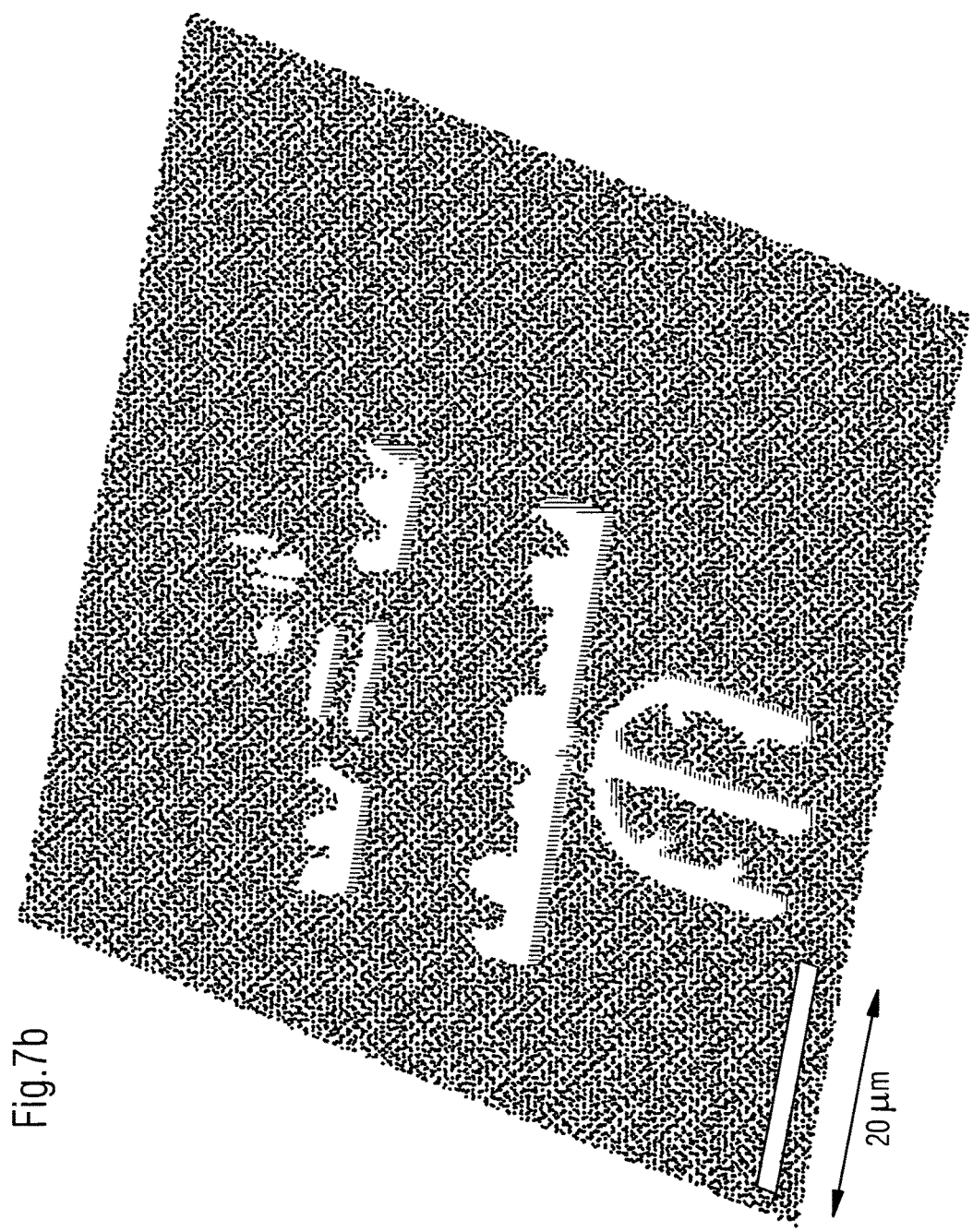

As seen in FIG. 6, the sample is modulated in the z direction, and the signal characteristic of the reflection is detected. The position of maximum intensity is determined from the reflection signal characteristic, and the position of maximum intensity corresponds to the optimum focus on the surface. If the position of maximum intensity is sent to a controller, the center of the modulation can be tracked, i.e., adapted to the surface topography of the sample. Measurement using such automatic confocal focus tracking is shown in FIGS. 7*a* and 7*b*. FIG. 7*a* shows the reflected light, and FIG. 7*b* shows the surface topography of the sample determined from tracking the focus.

Figure 8A:
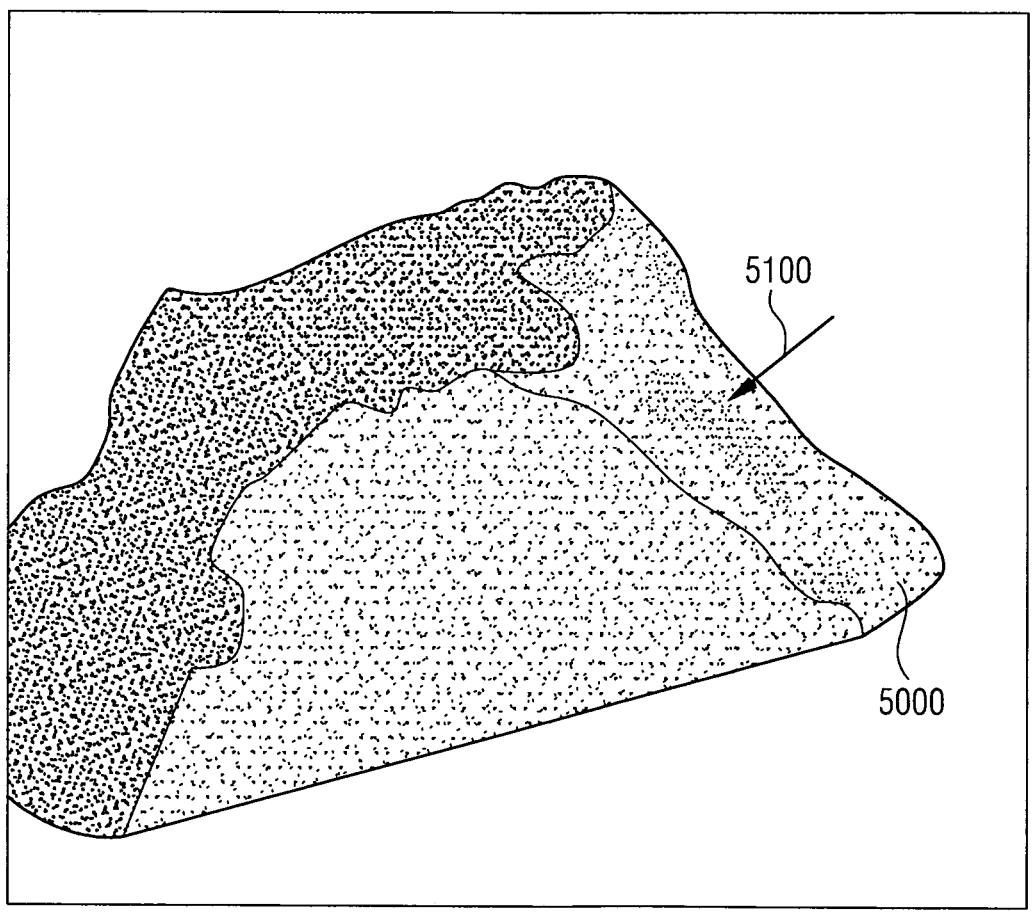
FIG. 8a-8d Sample and a measurement using a device according to FIG. 1b

FIGS. 8*a* to 8*d* show an object to be investigated, in this case the rock 5000 shown in FIG. 8*a*, the surface of which was investigated with the assistance of a device according to FIG. 1*b*.

Figure 8B:
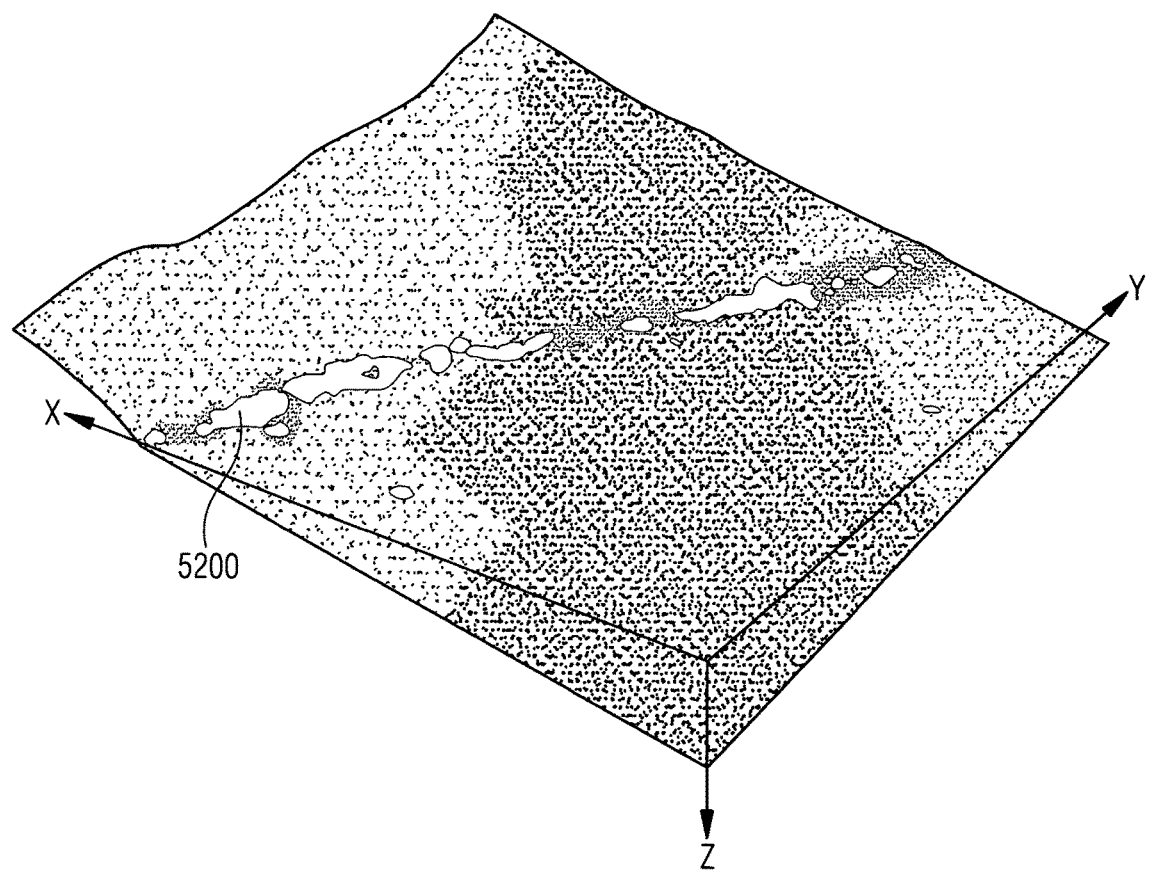

FIG. 8*b* shows a Raman measurement of the surface identified as 5100 in FIG. 8*a*. When the topography of the sample surface 5100 of the body from FIG. 8*a* is not taken into consideration, a Raman signal 5200 can only be obtained within the range of the focal plane of the Raman microscope.

Figure 8C:
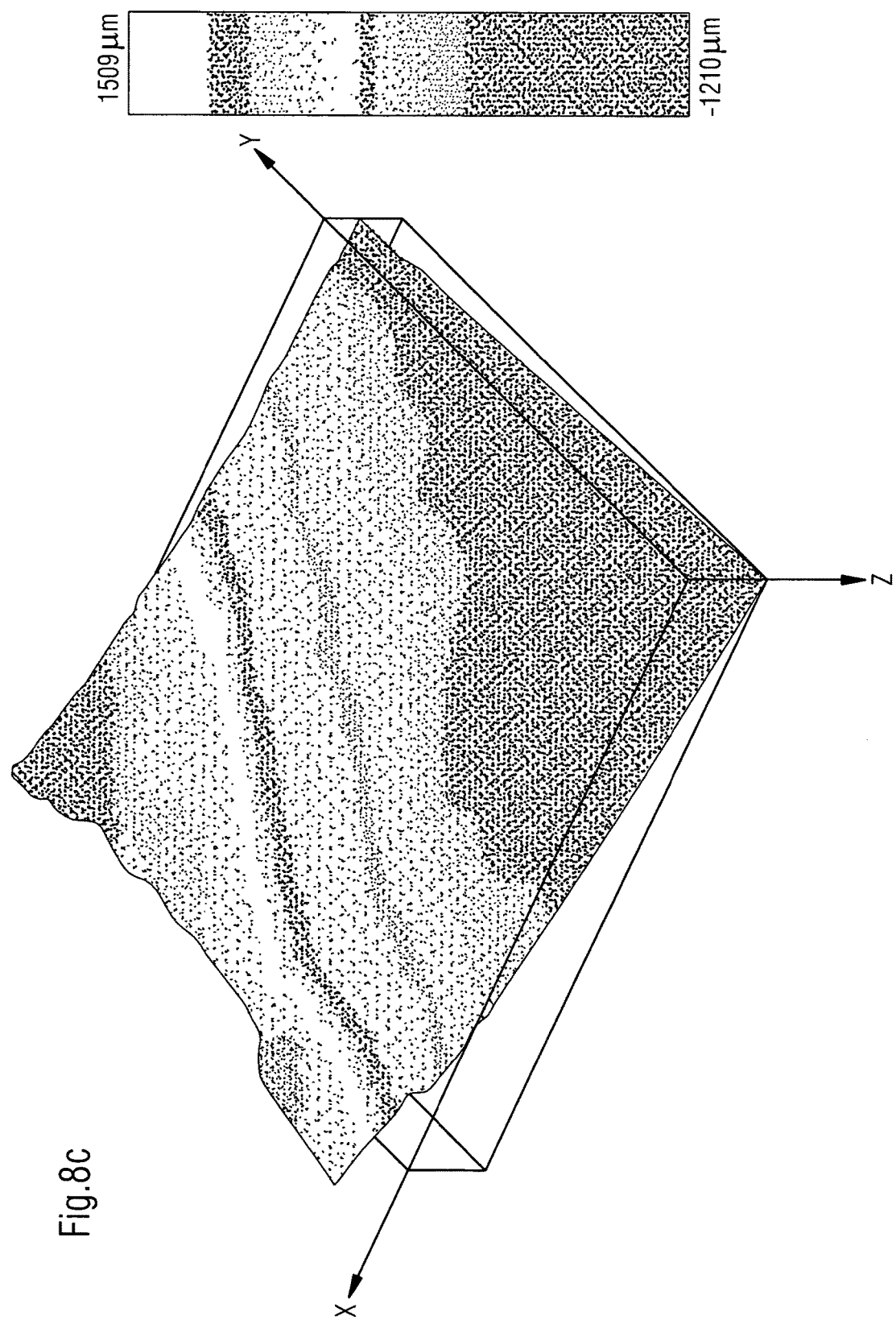

If the topography or the contour lines of these sample surface is detected with the assistance of the confocal chromatic sensor, the topographic image results which is shown in FIG. 8*c*.

Figure 8D:
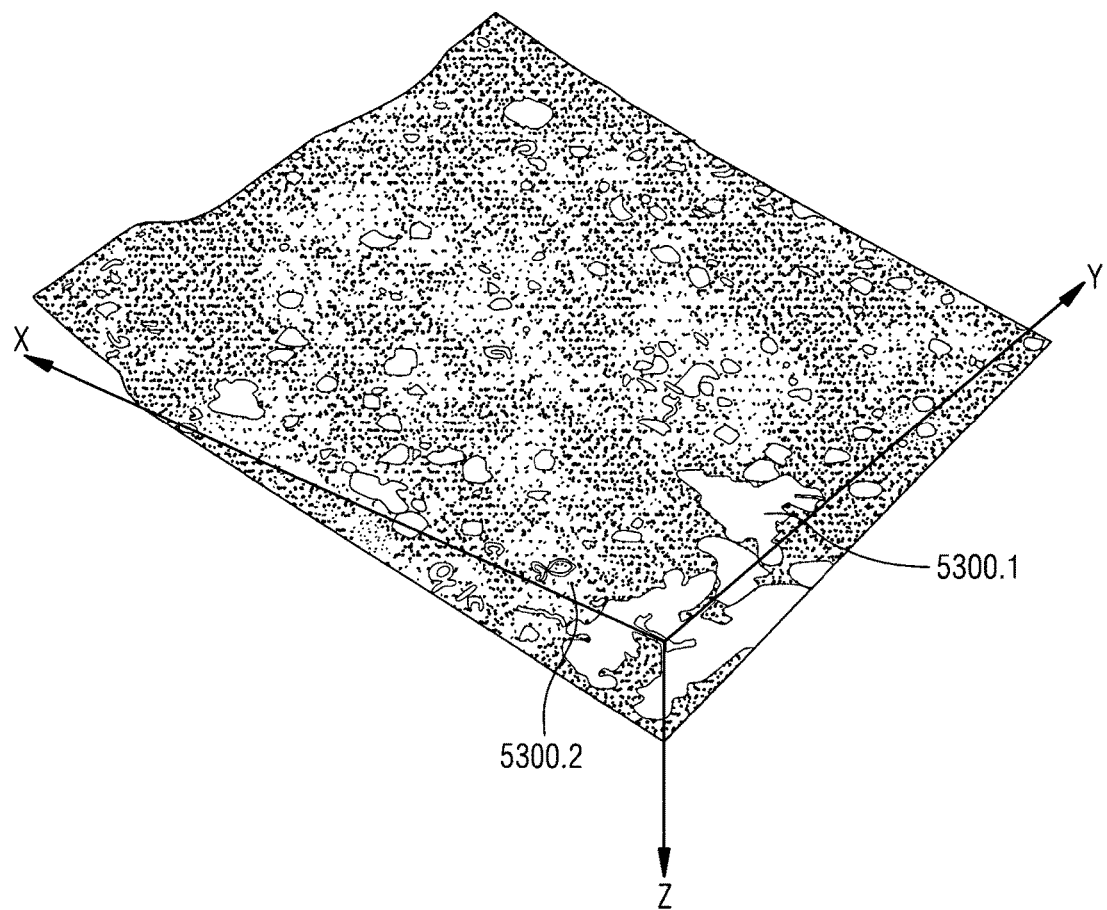

If the topography obtained in FIG. 8*c* using the device according to FIG. 1*b* is used to track the focus for Raman measurement, the surface results that is shown in FIG. 8*d*. Different Raman signals result for different materials for the various regions of the surface 100. The regions of different materials that result when the topography from FIG. 8*c* is taken into account are for example identified with reference numbers 5300.1, 5300.2.

By tracking the topography, the entire surface of the object from FIG. 8 can therefore be investigated aspectroscopically. If the topographic measurement is not included in the Raman measurement, a Raman measurement only results for the region in which the focus of the Raman microscope lies, as shown in FIG. 8*b*.

In the invention, a device is provided for the first time that makes it possible to easily and quickly obtain information about the surface topography. In particular, this is achieved with the assistance of a chromatic sensor that in turn can be combined with optical measuring methods, for example with confocal Raman microscopy. Alternately, the surface topography can be determined with the assistance of modulating the sample in the z direction.

What is claimed is:

1. A confocal microscope for imaging a surface of a sample having a surface topography, comprising:
   an optical axis;
   an objective lens;
   a light source operably arranged relative to the objective lens to form a substantially punctiform image at a confocal focal plane and to excite a light emission from the sample;
   a detector operably arranged relative to the objective lens to receive and detect the excited light emission from the sample;
   a sample table disposed adjacent the objective lens and generally at the confocal focal plane and that movably supports the sample in three orthogonal directions;
   a first control unit operably connected to the sample table to control a movement of the sample table;
   a mechanism configured to periodically move the sample along the optical axis relative to the microscope, through the confocal focal plane with a modulation amplitude greater than a highest portion of the sample surface topography;
   wherein said detector detects the excited light emission from the surface as the focal plane is moving and generates a detected light signal;
   a second control unit configured to determine a topography of the surface from the detected light signal by locating a position of a maximum Raman and/or Rayleigh intensity in each modulation period and maintaining the sample surface substantially in the confocal focal plane based on the determined surface topography by adjusting at least one of the sample table, the light source and the objective lens.

2. The confocal microscope of claim 1, wherein the second control unit provides a position signal to the first control unit, and the first control unit adjusts a position of the sample table in response to the position signal.

3. The confocal microscope of claim 2, wherein the substantially punctiform image of the sample surface formed by the light source has a lateral dimension of approximately 0.1 µm to 1 mm.

4. The confocal microscope of claim 3, wherein the substantially punctiform image of the sample surface formed by the light source has a resolution in a transverse direction to the sample surface in a range from approximately 1 nm to 1 mm.

5. The confocal microscope of claim 1, wherein the microscope is configured as one of: a confocal Raman microscope; a confocal fluorescence microscope; a confocal Raman/fluorescence microscope; or a confocal light microscope.

6. The confocal microscope of claim 5, wherein the confocal microscope is configured to perform a Raman and/or fluorescence measurement concurrently with the determination of surface topography by the second control unit.

7. The confocal microscope of claim 1, wherein the light source includes a laser.

8. The confocal microscope of claim 1, wherein the second control unit is configured to determine the surface topography by identifying locations of maximum intensity in the detected light signal.

9. The confocal microscope of claim 1, wherein the mechanism is configured to minimize a magnitude of the periodic movement by tracking a location of maximum intensity in the detected light signal.

10. A method of imaging a surface of a sample having a surface topography with a confocal microscope, the confocal microscope including an optical axis, an objective lens, a light source for exciting a light emission from the sample, a detector, and a sample table that movably supports the sample, the method comprising:
    forming a substantially punctiform image with the light source at a confocal focal plane;
    periodically moving the sample along the optical axis relative to the microscope, through the confocal focal plane with a modulation amplitude greater than a highest portion of the sample surface topography;
    detecting, with the detector the excited light emission from the surface as the confocal focal plane is moving along the optical axis to generate a detected light signal;
    determining a topography of the surface from the detected light signal by locating a position of a maximum Raman and/or Rayleigh intensity in each modulation period;
    maintaining the surface of the sample substantially in the confocal focal plane based on the determined surface topography by adjusting at least one of the sample table, the light source and the objective lens.

11. The method of claim 10, wherein the maintaining step includes determining a position signal, the method further comprising:
    providing the position signal to a control unit operably connected to the sample table; and
    adjusting, with the control unit, a position of the sample table based on the position signal.

12. The method of claim 10, wherein the substantially punctiform image of the sample surface formed by the light source has a lateral dimension of approximately 0.1 µm to 1 mm.

13. The method of claim 12, wherein the substantially punctiform image of the sample surface formed by the light source has a resolution in a transverse direction to the sample surface in a range from approximately 1 nm to 1 mm.

14. The method of claim 10, wherein the microscope is configured as one of: a confocal Raman microscope; a confocal fluorescence microscope; a confocal Raman/fluorescence microscope; or a confocal light microscope.

15. The method of claim 14, wherein the microscope is configured to perform a Raman and/or fluorescence measurement concurrently with the determination of surface topography.

16. The method of claim 10, wherein the light source includes a laser.

17. The method of claim 10, wherein the determining step includes determining the surface topography by identifying locations of maximum intensity in the detected light signal.

18. The method of claim 10, wherein the periodically moving step further includes minimizing a magnitude of the periodic movement by tracking a location of maximum intensity in the detected light signal.

19. The method of claim 10, wherein the surface topography has a roughness >10 µm and sample areas in the x-y-plane >300 µm.

20. The confocal microscope of claim 1, wherein the surface topography has a roughness >10 µm and sample areas in the x-y-plane >300 µm.

* * * * *